United States Patent
Yokoyama et al.

(10) Patent No.: US 10,385,765 B2
(45) Date of Patent: Aug. 20, 2019

(54) VARIABLE GEOMETRY TURBOCHARGER

(71) Applicant: MITSUBISHI HEAVY INDUSTRIES ENGINE & TURBOCHARGER, LTD., Sagamihara-shi, Kanagawa (JP)

(72) Inventors: Takao Yokoyama, Tokyo (JP); Masaki Tojo, Tokyo (JP); Satomi Nagae, Tokyo (JP); Masaki Osako, Tokyo (JP)

(73) Assignee: MITSUBISHI HEAVY INDUSTRIES ENGINE & TURBOCHARGER, LTD., Sagamihara-Shi, Kanagawa (JP)

( * ) Notice: Subject to any disclaimer, the term of this patent is extended or adjusted under 35 U.S.C. 154(b) by 508 days.

(21) Appl. No.: 14/655,125

(22) PCT Filed: Dec. 27, 2012

(86) PCT No.: PCT/JP2012/083862
§ 371 (c)(1),
(2) Date: Jun. 24, 2015

(87) PCT Pub. No.: WO2014/102962
PCT Pub. Date: Jul. 3, 2014

(65) Prior Publication Data
US 2015/0330293 A1    Nov. 19, 2015

(51) Int. Cl.
*F02B 37/24* (2006.01)
*F01D 17/16* (2006.01)
*F02C 6/12* (2006.01)

(52) U.S. Cl.
CPC ............ *F02B 37/24* (2013.01); *F01D 17/16* (2013.01); *F02C 6/12* (2013.01); *Y02T 10/144* (2013.01)

(58) Field of Classification Search
CPC ...... F01D 17/16; F01D 17/162; F01D 17/165; F01D 9/042; F01D 9/045; F01D 11/005; F02B 37/24
See application file for complete search history.

(56) References Cited

U.S. PATENT DOCUMENTS

| 2010/0293942 A1 | 11/2010 | Martinez-Botas |
| 2011/0206500 A1 | 8/2011 | Nagao et al. |
| 2015/0300193 A1* | 10/2015 | Shoyama ............ F01D 11/005 416/174 |

FOREIGN PATENT DOCUMENTS

| CN | 102203396 A | 9/2011 |
| EP | 2 351 920 A1 | 3/2011 |

(Continued)

OTHER PUBLICATIONS

Chinese Office Action effective Nov. 22, 2016 issued in the corresponding Chinese Application No. 201280077996.5.
(Continued)

*Primary Examiner* — Christopher Verdier
*Assistant Examiner* — Cameron A Corday
(74) *Attorney, Agent, or Firm* — Birch, Stewart, Kolasch & Birch, LLP

(57) ABSTRACT

An object is to is to reduce a leakage flow by reducing a clearance between an end surface of a nozzle vane, forming a variable nozzle mechanism of a variable geometry turbocharger, and a wall surface facing the end surface, and prevent the nozzle vane from being stuck due to contact of the end surface.

A variable geometry turbocharger includes a nozzle shaft 49 which protrudes on one of the both end surfaces 58 of a nozzle vane 45 and rotatably supports the nozzle vane 45, a shaft hole 53 in which the nozzle shaft 49 fits with a gap in between, a distal end surface 57 of the nozzle vane with which a clearance is reduced when the nozzle vane 45 which has received exhaust-gas pressure is inclined toward an inner diameter side due to a fitting gap formed between the shaft hole 53 and the nozzle shaft 49 fit to each other, the clearance being formed between the distal end surface 57 and a wall surface 59a of another one of the parallel walls, and a clearance reduction promotion portion 65 which (Continued)

promotes reduction of the clearance with an increased inclination angle of the distal end surface 57 or an increased exhaust-gas-affected surface of the nozzle vane 45.

13 Claims, 8 Drawing Sheets

(56) References Cited

FOREIGN PATENT DOCUMENTS

| JP | 61-126001 U | 8/1986 |
|---|---|---|
| JP | 4-26659 Y2 | 6/1992 |
| JP | 2510651 Y2 | 9/1996 |
| JP | 11-229815 A | 8/1999 |
| JP | 2001-132464 A | 5/2001 |
| JP | 2008-215083 A | 9/2008 |
| JP | 2010-112223 A | 5/2010 |
| JP | 2010-525209 A | 7/2010 |
| JP | 4719251 B2 | 7/2011 |
| JP | 2011-153623 A | 8/2011 |
| JP | 2011-252439 A | 12/2011 |
| JP | 2012-137068 A | 7/2012 |
| WO | WO 2008/129274 A2 | 10/2008 |
| WO | WO 2010/052911 A1 | 5/2010 |

OTHER PUBLICATIONS

International Preliminary Report on Patentability and Written Opinion of the International Searching Authority, along with an English translation (forms PCT/IB/373, PCT/ISA/237, PCT/IB/326 and PCT/IB/338), dated Jul. 9, 2015 for International Application No. PCT/JP2012/083862.

International Search Report and Written Opinion of the International Searching Authority (forms PCT/ISA/210, PCT/ISA/237 and PCT/ISA/220), dated Apr. 2, 2013, for International Application No. PCT/JP2012/083862.

Decision to Grant a Patent effective Apr. 12, 2016 issued in corresponding Japanese Application No. 2014-553962 with an English Translation.

Extended European Search Report dated Dec. 18, 2015 issued in the corresponding EP Application No. 12890999.1.

* cited by examiner

VARIABLE GEOMETRY TURBOCHARGER

TECHNICAL FIELD

The present invention relates to a variable geometry turbocharger for an internal combustion engine and more particularly relates to a technique, used in a variable geometry turbocharger in which exhaust gas from an engine acts on a turbine rotor through inside of a scroll formed in a turbine casing and a plurality of variable nozzle vanes, for preventing leakage through a clearance between both end surfaces of the variable nozzle vanes, forming the variable nozzle mechanism, and wall surfaces facing the side surfaces.

BACKGROUND

Tightened emission control has brought about a strong demand for higher response to engine low velocity, and thus higher response of a turbocharger has been called for.

When the engine is accelerated, exhaust-gas pressure increased by reducing an opening degree of nozzle vanes in a variable capacity turbine, and thus the number of revolutions of the turbine is increased.

An excessively small opening degree of the nozzle vanes leads to a large leakage loss through clearances between both side surfaces of the nozzle vane and wall surfaces facing the side surfaces, and thus leads to a lower efficiency. Thus, there is a problem that the number of revolutions cannot be increased quickly.

It has quite commonly been known that the efficiency can be improved by reducing the clearance involving the nozzle vane. Unfortunately, the nozzle vanes might be stuck when the clearance is too small when components adjacent to the nozzle vane are thermally deformed by combustion gas.

Prior techniques related to the reduction of the clearance involving the nozzle vane includes Patent Document 1 (Japanese Patent Application Laid-open No. H11-229815).

Patent Document 1 discloses a technique of preventing gas from flowing through a clearance between a nozzle vane 100 and parallel walls 102. More specifically, a configuration of a variable capacity turbine is disclosed in which a nozzle chamber 104 defined by a pair of parallel walls 102 is disposed between a scroll chamber and a turbine wheel, both end portions 106 and 106 of the nozzle vanes 100 facing the parallel walls 102 have a thickness larger than a thickness t1 of a center portion 108, and end surfaces of the both end portions are formed to be parallel to the parallel walls 102 and to have a width t2.

CITATION LIST

Patent Literature

Patent Document 1: Japanese Patent Application Laid-open No. H11-229815

SUMMARY

Technical Problem

In Patent Document 1, the both end portions 106 and 106 of the nozzle vanes 100 are formed to be thicker than the center portion 108 and extend in parallel with the both end portions 106 and 106 of the nozzle vanes 100 to ensure a sealing property. However, a document does not disclose a solution to a problem that when thermal deformation occurs, the distance between the parallel walls 102 is reduced and the clearances between the both end portions 106 and 106 of the nozzle vanes 100 and the parallel walls 102 are also reduced, and the nozzle vane 100 is likely to be stuck.

Thus, a configuration has been called for in which clearances between both end portions of a nozzle vane and parallel walls are reduced to ensure a sealing property for achieving lower clearance loss, and the nozzle vane will not be stuck with the both end portions between the parallel walls even when a distance between the parallel walls is reduced by thermal deformation.

Thus, in view of the problems described above, an object of the present invention is to reduce a leakage flow by reducing a clearance between an end surface of a nozzle vane, forming a variable nozzle mechanism of a variable geometry turbocharger, and a wall surface to achieve a higher turbocharging efficiency, and prevent the nozzle vane from being stuck with the end surface in contact with the wall surface even when thermal deformation occurs.

Solution to Problem

To achieve the object, the present invention provides a variable geometry turbocharger in which exhaust gas from an engine acts on a turbine rotor through inside of a scroll chamber formed in a turbine casing and a plurality of variable nozzle vanes, the variable geometry turbocharger including a nozzle vane accommodating unit in which the plurality of variable nozzle vanes are arranged in a circumferential direction between the scroll chamber and the turbine rotor, the nozzle vane accommodating unit including parallel walls formed to be substantially parallel to both end surfaces of each of the nozzle vanes with a gap in between, a nozzle shaft which protrudes on one of the both end surfaces of the nozzle vane and rotatably supports the nozzle vane, a shaft hole in which the nozzle shaft fits with a gap in between, the shaft hole being formed in one of the parallel walls, a distal end surface of the nozzle vane with which a clearance is reduced when the nozzle vane which has received exhaust-gas pressure is inclined toward an inner diameter side due to a fitting gap formed between the shaft hole and the nozzle shaft fit to each other, the clearance being formed between the distal end surface and a wall surface of another one of the parallel walls, and a clearance reduction promotion portion which promotes reduction of the clearance, formed by the inclination of the distal end surface of the nozzle vane, with an increased inclination angle of the distal end surface or an increased exhaust-gas-affected surface of the nozzle vane.

According to the present invention, the variable nozzle vanes are arranged in the circumferential direction in the nozzle vane accommodating unit including the parallel walls, and the variable nozzle vanes are rotatably supported by the wall surface of one of the parallel walls with only one side being supported by fitting the nozzle shaft in the shaft hole.

Since the fitting gap is formed between the nozzle shaft and the shaft hole, which are fit to each other with a backlash, the other end surface (distal end surface) of the nozzle vanes is inclined toward the inner diameter side as a turbine rotor side by the exhaust-gas pressure.

More specifically, in a comparative example shown in FIG. 3A, with a fitting gap (backlash between a shaft hole 6 and a nozzle shaft 8) in a state where the fitting is achieved with a center line 6a of the shaft hole 6 formed in a wall surface 4 of a parallel wall 2 to extend in a direction orthogonal to the wall surface 4 matching a center line 8a of the nozzle shaft 8, the nozzle vanes 10, having received the exhaust-gas pressure, has another end surface (distal end surface) 12 inclined toward the inner diameter side by an inclination angle θ1.

By this inclination of the nozzle vane 10, a distal end corner portion of the other end surface 12 moves from P1 to P2 (refer to FIG. 3A), and the clearance between the wall surface 4 and the distal end surface 12 reduces from C0 to C1. The present invention utilizes the inclination of the nozzle vanes 10 due to the fitting gap caused by the exhaust-gas pressure to reduce an amount leakage from a reduced clearance between the end surfaces of the nozzle vane and the wall surface 4 of the parallel wall 2.

However, when the backlash is expanded by increasing the size of the fitting gap between the shaft hole 6 and the nozzle shaft 8 by simply increasing the size of the shaft hole 6, friction between the nozzle shaft 8 and the shaft hole 6 increases. Moreover, the opening degree of the nozzle vane 10 is difficult to control accurately because of the expanded backlash. Furthermore, a certain amount of clearance from the wall surface 4 needs to be maintained considering the fact that the nozzle vane 10 might be stuck (become unmovable) when the nozzle vane 10 and the parallel wall 2 thermally deform.

In view of this, the present invention uses a distal end surface of the nozzle vane that achieves a small clearance from the wall surface of the parallel wall when the nozzle vane that has received the exhaust-gas pressure is inclined due to the fitting gap obtained when the nozzle shaft is fit in the shaft hole. The present invention further uses a clearance reduction promotion portion that increases the inclination angle of the distal end surface or the exhaust-gas-affected surface of the nozzle vane to facilitate the reduction of the clearance formed by the inclination of the distal end surface of the nozzle vane.

Thus, the inclination angle of the distal end surface or the exhaust-gas-affected surface of the nozzle vane is increased with the clearance reduction promotion portion so that the reduction of the clearance formed by the distal end surface of the nozzle vane is facilitated without changing the fitting gap obtained when the nozzle shaft is fit in the shaft hole.

The reduction of the clearance from the parallel wall can be facilitated by the distal end surface of the nozzle vane, more specifically, by a corner portion (portion P1 in FIG. 3A) of the distal end surface. As a result, the sealing property can be ensured, and the clearance loss can be reduced by reducing the clearance between the both end surfaces of the nozzle vane and the parallel wall.

When thermal deformation occurs, the both end surfaces of the nozzle vane are pushed back by the wall surfaces of the parallel walls that have thermally deformed to return to original positions before the inclination. The original positions before the inclination are set, while taking the thermal deformation into consideration, so that the clearance is ensured. Thus, the nozzle vane, in a state where the both end surfaces have been returned to the original positions, will not be stuck to be unable to move due to the relationship between the both end surfaces and the surfaces of the parallel walls, whereby the nozzle vane can rotate.

As described above, in the present invention, a leakage flow is reduced by reducing the clearances between the both end surfaces of the nozzle vane and the wall surfaces of the parallel walls facing the surfaces, and thus a higher turbocharging efficiency can be achieved. Furthermore, the nozzle vanes can be prevented from being stuck due to the contact of the both end surfaces even when thermal deformation occurs.

In the present invention, preferably, both end surfaces have a linear shape in a cross-sectional shape of the nozzle vane taken along the nozzle shaft direction, and in the clearance reduction promotion portion, the shaft hole is inclined to have a portion, closer to the one of the parallel walls, positioned more on the inner diameter side.

Since the shaft hole is inclined to have a portion, closer to the one of the parallel walls, positioned more on the inner diameter side in the clearance reduction promotion portion as described above, the inclination angle of the nozzle vane can be increased.

More specifically, as shown in FIG. 3B, when the nozzle vane is mounted with the center line of the shaft hole matching the center line of the vane shaft, the clearance from the wall surface of the parallel wall is reduced from C1 to C2 by an amount corresponding to an inclination amount of the shaft hole. An initial clearance is C2 in FIG. 3B. When the exhaust-gas pressure causes the inclination by an amount corresponding to the backlash in the fitting gap between the shaft hole and the nozzle shaft, the other end surface of the nozzle vane is further inclined toward the inner diameter side, whereby a clearance C3 smaller than C2 can be obtained. Thus, the clearance loss can be reduced.

When thermal deformation occurs, the nozzle vane having been inclined are pushed back, and thus the nozzle vane returns by an amount corresponding to the backlash due to the fitting gap between the shaft hole and the nozzle shaft to be at the position orthogonal to the surfaces of the parallel walls. Thus, the clearance from the parallel walls is maintained within a range in which the nozzle vane will not be stuck. More specifically, the nozzle vane is kept at the position with an initial setting clearance with which the nozzle vane will not be stuck.

In the present invention, preferably, in the clearance reduction promotion portion, at least one of an inner diameter side of the shaft hole on a side closer to the nozzle vane and an outer diameter side of the shaft hole on a side opposite to the nozzle vane is formed by chamfering.

Since the clearance reduction promotion portion is formed by chamfering so that the vane inclination angle is increased as described above, the nozzle shaft and the nozzle vanes need not to be deformed, and only the opening end portion of the shaft hole needs to be chamfered, whereby processing to change the structure can be easily performed. The shaft hole may have the side of the nozzle vane and/or the side opposite to the nozzle vane chamfered. Thus, the chamfered portion can be easily formed in accordance with the set inclination angle obtained by the chamfering.

In the present invention, preferably, both end surfaces have a linear shape in a cross-sectional shape of the nozzle vane taken along the nozzle shaft direction, and in the clearance reduction promotion portion, a direction orthogonal to a distal end surface having the linear shape is inclined toward the inner diameter side with respect to a center line of the nozzle shaft which fits the shaft hole, the shaft hole extending in a direction orthogonal to a wall surface of the one of the parallel walls.

Since the direction orthogonal to the distal end surface having the linear shape of the nozzle vane is inclined toward the inner diameter side with respect to the center line of the nozzle shaft which fits the shaft hole extending in the direction orthogonal to the wall surface of the parallel wall as described above, the inclination angle of the nozzle vane can be increased.

More specifically, as shown by a solid line in FIG. 5A or a dotted line in FIG. 5B, the nozzle vanes are inclined by the inclination angle θ2 toward the inner diameter side with a clearance of D1. When the exhaust-gas pressure acts on the nozzle vanes in this state, the nozzle shaft can be inclined until the nozzle shaft comes into contact with the opposite inner circumference surface of the shaft hole. Thus, as shown by a solid line in FIG. 5B, the nozzle vanes can be largely inclined toward the turbine rotor side, that is, the inner diameter side, until the nozzle shaft comes into contact with the opposite inner circumference surface of the shaft hole. Thus, an even smaller clearance D2 can be achieved, whereby the clearance loss can be reduced.

The shaft hole is not inclined with respect to the surface of the parallel wall, and is a shape extending in a direction orthogonal to the surface of the parallel wall, and thus can be easily processed.

When thermal deformation occurs, the inclined nozzle vane is pushed back by the wall surface of the parallel wall to return by an amount corresponding to the backlash due to the fitting gap between the shaft hole and the nozzle shaft. Thus, the nozzle vane returns to the position orthogonal to the wall surface of the parallel wall as shown in FIG. 5C. Thus, the clearance from the parallel wall is maintained within a range in which the nozzle vane will not be stuck. More specifically, the nozzle vane is kept at the position with an initial setting clearance with which the nozzle vane will not be stuck.

In the present invention, preferably, both end surfaces have a linear shape in a cross-sectional shape of the nozzle vane taken along the nozzle shaft direction, and in the clearance reduction promotion portion, one of the both end surfaces on a side of the nozzle shaft is inclined to have a portion more on an outer diameter side farther from the one of the parallel walls and a portion more on an inner diameter side closer to the one of the parallel walls, to increase the exhaust-gas-affected surface of the nozzle vane.

In the present invention, preferably, both end surfaces have a linear shape in a cross-sectional shape of the nozzle vane taken along the nozzle shaft direction, and in the clearance reduction promotion portion, a distal end surface which is one of the both end surfaces on a side opposite to the nozzle shaft is formed to be inclined to have a portion more on an outer diameter side closer to the other one of the parallel walls and a portion more on an inner side farther from the other one of the parallel walls, to increase the exhaust-gas-affected surface of the nozzle vane.

In the present invention, preferably, both end surfaces have a linear shape in a cross-sectional shape of the nozzle vane taken along the nozzle shaft direction, in the clearance reduction promotion portion, one of the both end surfaces on a side of the nozzle shaft is inclined to have a portion more on an outer diameter side farther from the one of the parallel walls and have a portion more on an inner diameter side closer to the one of the parallel walls, and the distal end surface on a side opposite to the nozzle shaft is inclined to have a portion more on an outer diameter side closer to the other one of the parallel walls and a portion more on an inner diameter side farther from the other one of the parallel walls, to increase the exhaust-gas-affected surface of the nozzle vane.

As described above, in the clearance reduction promotion portion, one of the both end surfaces of the nozzle vane closer to the nozzle shaft has a linear shape inclined to have a portion more on the inner diameter side closer to the wall surface of the parallel wall, and one of the both end surfaces of the nozzle vane farther from the nozzle shaft has a linear shape inclined to have a portion more on the inner diameter side farther from the wall surface of the parallel wall. Thus, the exhaust-gas-affected surface of the nozzle vane for receiving the exhaust-gas pressure can be increased.

More specifically, as shown in FIG. 6A, when the nozzle vane is mounted with the center line of the vane shaft matching the center line of the shaft hole, the clearance from the wall surface of the parallel wall is reduced by an amount corresponding to the inclined amount of the distal end surface of the nozzle vane. In FIG. 6A, an initial clearance E1 is achieved. When the exhaust-gas pressure causes the inclination of the other end surface of the nozzle vanes toward the inner diameter side by an amount corresponding to the backlash due to the fitting gap between the shaft hole and the nozzle shaft, an even smaller clearance E2 can be achieved, whereby the clearance loss can be reduced.

With a longer diagonal line of a rectangular shape, the exhaust-gas-affected surface on which the exhaust-gas pressure acts can be increased. Thus, the amount of reduction of the clearance corresponding to the inclination angle of the inclined nozzle vane can be made large, whereby the clearance can be effectively reduced.

The shaft hole has a shape extending in a direction orthogonal to the wall surface of the parallel wall, and thus can be processed easily. The vane shaft fixedly adheres to an end surface of the nozzle vane while extending in the same direction as the center line of the nozzle vane, and thus fixedly adheres to the end surface of the nozzle vane while being inclined with respect to the center line of the nozzle vane, and thus can be manufactured easily.

When thermal deformation occurs as shown in FIG. 6C, the both end surfaces of the nozzle vane are pressed by the wall surfaces of the parallel walls, so that the inclined nozzle vane is pushed back to return by an amount corresponding to the backlash due to the fitting gap between the shaft hole and the nozzle shaft. Thus, the nozzle vane is inclined toward the outer diameter side with respect to the direction orthogonal to the wall surface. Thus, the clearance from the parallel wall is maintained within a range in which the nozzle vane will not be stuck. More specifically, the nozzle vane is kept at the position with an initial setting clearance with which the nozzle vane will not be stuck.

In the present invention, preferably, the inclination angle of the nozzle vane toward the inner diameter side is set to be in a range from 0.3° to 5.0°, due to an increase in the inclination angle of the nozzle vane achieved by the clearance reduction promotion portion.

The test has shown that the inclination angle of 0.3° or larger toward the inner diameter side is effective, the inclination angle of 0.5° or larger can reduce the clearance to half, and the inclination angle of 1° or larger can substantially eliminate the clearance. Thus, the range from 0.3° to 1.0° is preferable and the range from 0.5° to 1.0°, which has been proven to be especially effective, is even more preferable.

When the angle is equal to or larger than 5.0°, the nozzle vanes excessively inclined and thus are likely to be stuck on the surfaces of the parallel walls, and are likely to wear fast due to a large backlash.

In the present invention, preferably, the nozzle vane is inclined toward the inner diameter side by the exhaust-gas pressure at the time when the nozzle vane is fully closed.

Since the nozzle vane is inclined toward the inner diameter side of the turbine rotor by the exhaust-gas pressure at the time when the nozzle vane is fully closed as described above, a leakage flow a clearance between the both end surfaces of the nozzle vanes fully closed and the parallel walls can be reduced and acceleration performance of the engine can be enhanced with an improved flowrate reduction property in the fully closed state.

Advantageous Effects

In the present invention, the clearance between the end surfaces of the nozzle vane, forming the variable nozzle mechanism of the variable geometry turbocharger, the wall surfaces facing the both end surfaces is reduced to reduce the leakage flow, whereby the clearance loss can be reduced and the higher supercharging efficiency can be achieved. In addition, even when thermal deformation occurs, the nozzle vanes can be prevented from being stuck due to contact with the both end surfaces.

DETAILED DESCRIPTION

Preferred embodiments of the present invention will now be described in detail with reference to the accompanying drawings. It is intended, however, that dimensions, materials, shapes, relative positions, and the like of components described in the embodiments below shall be interpreted as illustrative only and not limitative of the scope of the present invention unless otherwise specified.

Figure 1:
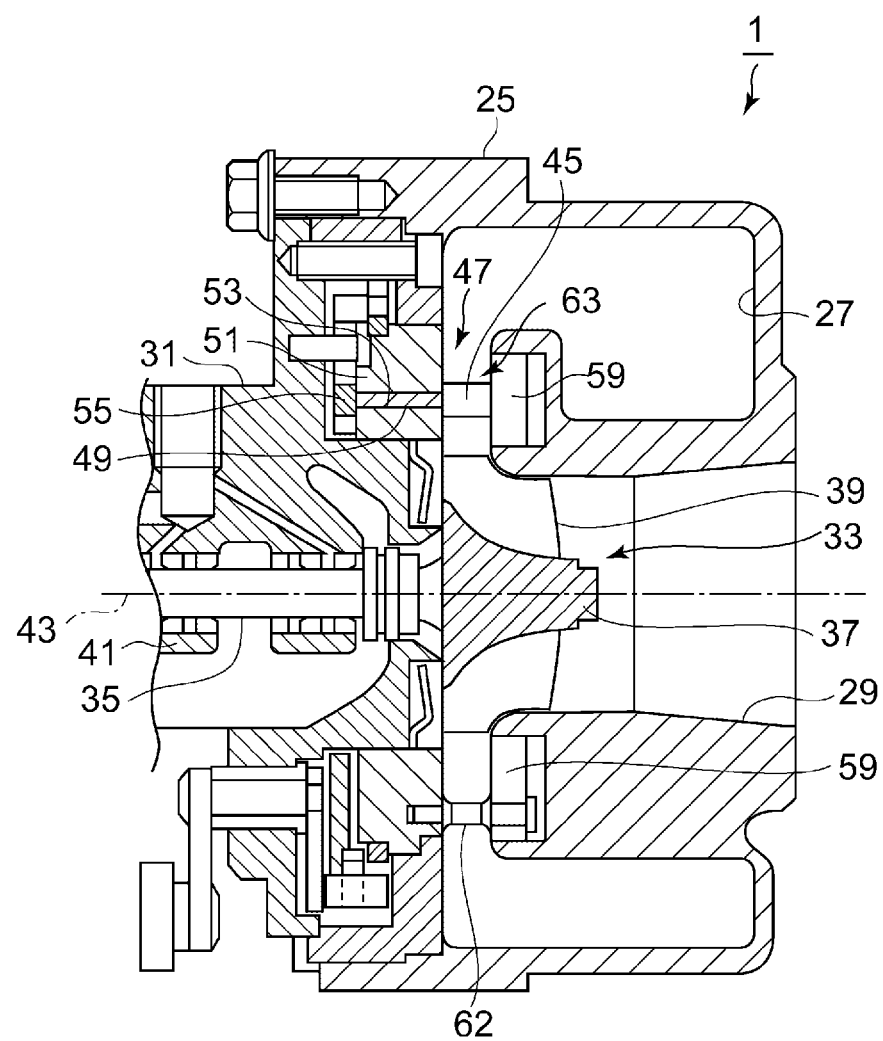
FIG. 1 is a cross-sectional view of a main part of a variable geometry turbocharger.

With reference to FIG. 1, an entire configuration of a variable geometry turbocharger 1 will be described.

In FIG. 1, a spiral scroll 27 is formed in a turbine casing 25. A gas outlet path 29 is formed on an inner circumference side of the spiral scroll 27. Furthermore, a compressor casing accommodating an unillustrated compressor, the turbine casing 25, and a bearing housing 31 are formed.

A turbine rotor 33 includes: a hub 37 fixed to an end portion of a rotor shaft 35, and a plurality of rotor vanes 39 fixedly adhering to an outer circumference of the hub 37 while being arranged at an equal interval in a circumferential direction. The unillustrated compressor is coupled to a side of the rotor shaft 35 opposite to the turbine rotor 33.

The unillustrated compressor is coupled to a side of the rotor shaft 35 opposite to the turbine rotor 33. A bearing 41 which supports the rotor shaft 35 is disposed in the bearing housing 31. The rotor shaft 35 and the hub 37 rotate about a center line of rotation 43.

Figure 2:
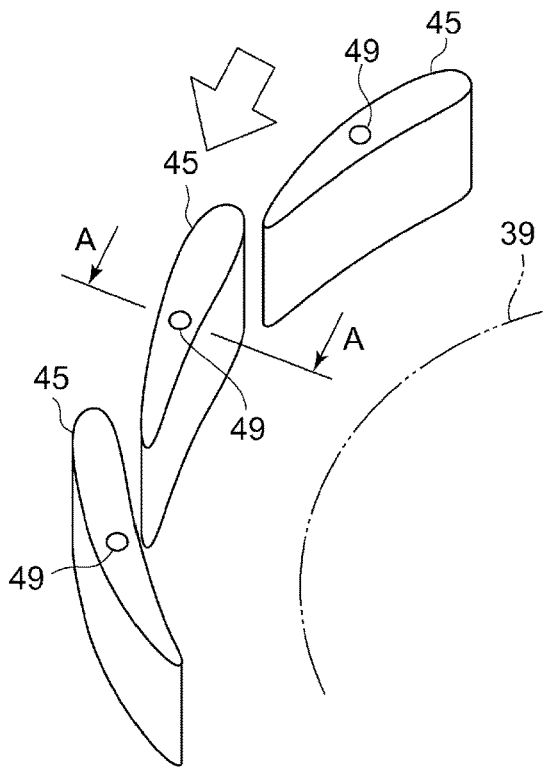
FIG. 2 is a perspective view showing an overview of variable nozzle vanes.

A plurality of nozzle vanes 45 are disposed on an inner circumference side of the scroll 27 at an equal interval along the circumferential direction of the turbine rotor 33 (see FIG. 2). A variable nozzle mechanism 47 can change the vane angle of the nozzle vane 45.

The nozzle vane 45 has a blade shape in a cross sectional view taken along a longitudinal direction. The nozzle vane 45 has, for example, a rectangular shape in a cross sectional view taken along a short side direction. A rotation shaft (nozzle shaft) 49 is attached to a center portion of the nozzle vane 45 in the longitudinal direction. The rotation shaft 49 has one end welded onto one end surface 58 of the nozzle vane 45.

The other end of the rotation shaft 49 is coupled to a lever plate 55 for rotating the rotation shaft 49 through a through hole (shaft hole) 53 formed in a nozzle mount 51.

The other end surface (distal end surface) 57 of the nozzle vane 45 is disposed at a position facing a ring plate 59, having a ring shape, with a gap in between. The ring plate 59 is coupled to the nozzle mount 51 with a predetermined distance maintained by a supporting pin 62.

Parallel walls are formed by a wall surface 51a of the nozzle mount 51 and a wall surface 59a of the ring plate 59 on both sides of the both end surfaces 57 and 58 of the nozzle vanes 45. A nozzle vane accommodating unit 63 is formed by the parallel walls.

While the variable geometry turbocharger 1 with the variable nozzle mechanism including the turbine rotor 33 is in operation, exhaust gas from the engine enters the scroll 27, and flows in while applying exhaust-gas pressure to the nozzle vanes 45 by swirling along a spiral in the scroll 27.

Subsequently, the exhaust gas flows in a radial direction toward the center of the turbine rotor 33 through a space between the nozzle vanes 45 to provide an expansion effect for the turbine rotor 33, and then flows out in an axial direction to be discharged out of the device through the gas outlet path 29.

In the variable geometry turbocharger 1, the nozzle vanes 45 are closed when the engine is accelerated for reducing the flowrate and increasing the flow speed.

A configuration of the variable nozzle mechanism 47 in which the rotation shaft 49 is disposed through and supported in the through hole (shaft hole) 53 formed in the nozzle mount 51 described above is merely an example. Alternatively a shroud side through hole may be used, and thus any configuration can be employed as long as the nozzle vanes, having only one side supported, are rotatably accommodated in the nozzle vane accommodating unit formed by the parallel walls.

(First Embodiment)

Figure 3A:
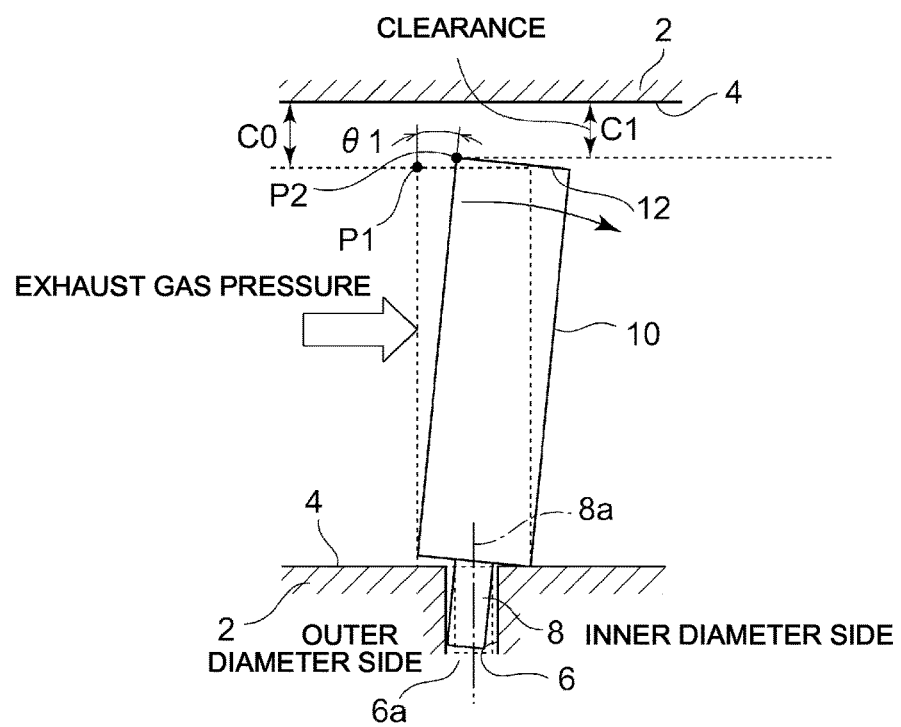
FIG. 3A is diagram showing a comparative example.
Figure 3B:
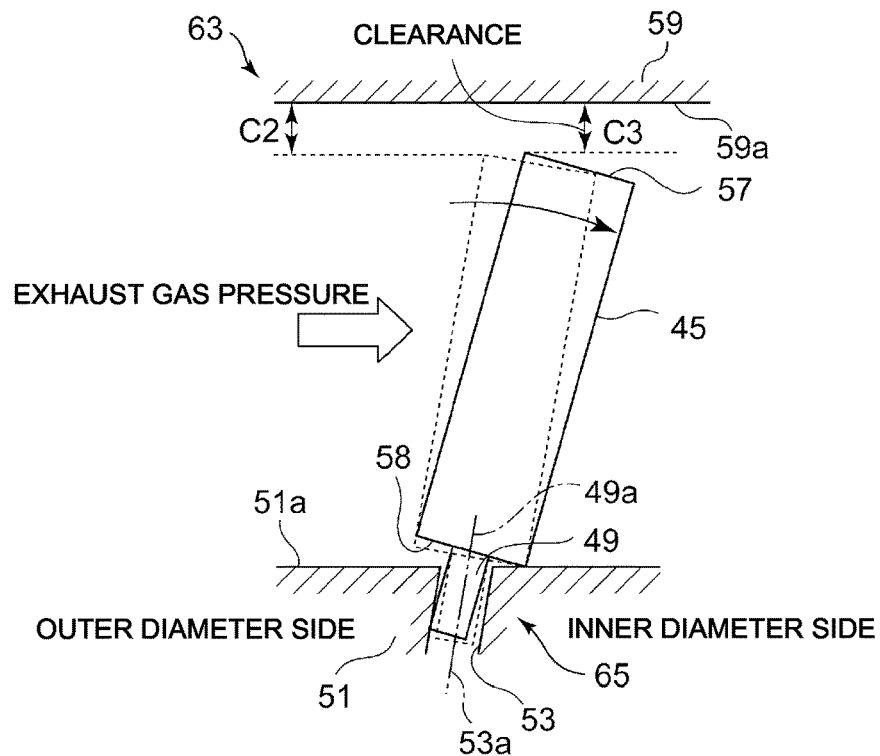
FIG. 3B is a diagram, showing a cross-sectional view taken along line A-A in FIG. 2, for describing a state where gas pressure is applied in a first embodiment.
Figure 3C:
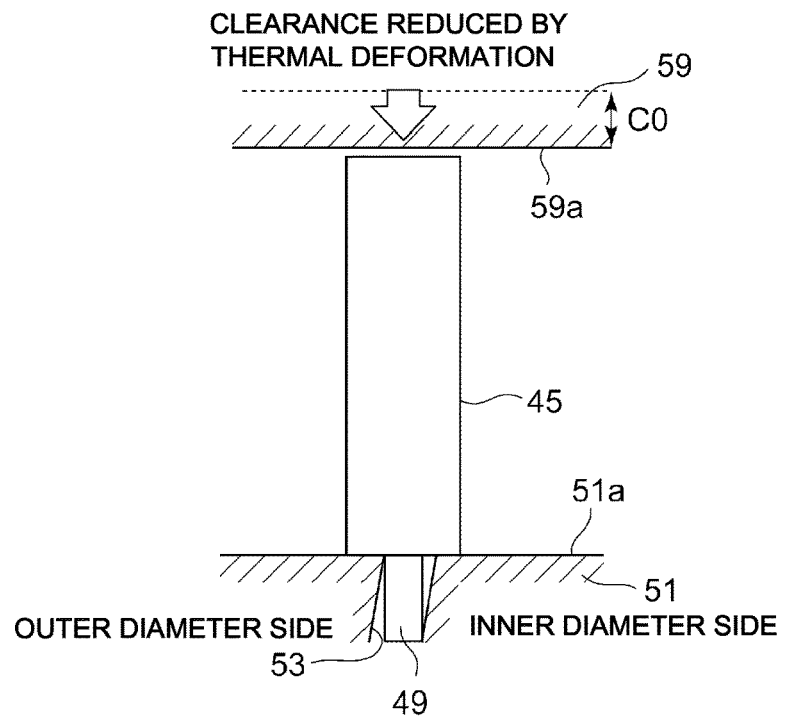
FIG. 3C is a diagram for describing a thermally deformed state in the first embodiment.

With reference to FIGS. 3A to 3C, a first embodiment will be described.

FIGS. 3A to 3C are schematic cross-sectional views taken along line A-A in FIG. 2. FIG. 3A is a diagram for describing a comparative example.

The rotation shaft (nozzle shaft) 49 is attached to the one end surface 58 of the nozzle vane 45. A center line 45a of the nozzle vane 45 matches a center line 49a of the rotation shaft 49. The rotation shaft 49 is rotatably fit in the through hole (shaft hole) 53 with a fitting gap.

As described above, the nozzle vanes 45 has a blade shape in a cross sectional view taken along the longitudinal direction, and has a rectangular shape in a cross sectional view taken along the short side direction. The rotation shaft (nozzle shaft) 49 is attached to the center portion of the nozzle vane 45 in the longitudinal direction. The rotation shaft 49 has one end attached to one end surface 58 of the nozzle vane 45.

The rectangular shape in a cross sectional view taken along the short side direction is merely an example, and any shape may employed as long as an end surface has a linear shape. More specifically, a side surface portion including upstream and downstream sides of the flow of the exhaust gas may have a curved shape as long as the end surface has ad linear shape.

FIG. 3A is a diagram for describing a comparative example which has already been described and will be briefly described.

A dotted line represents a mounted state before the exhaust-gas pressure is applied. A solid line represents a state where a nozzle vane 10 on which exhaust-gas pressure acts is inclined by an amount corresponding to a size of the fitting gap between a rotation shaft 8 and a through hole 6. Thus, the nozzle vane 10 is inclined toward an inner diameter side of the other end surface (distal end surface) by an inclination angle θ1.

The other end surface (distal end surface) 12 of the nozzle vane 10 thus inclined approaches a wall surface 4, whereby a clearance C1 is formed between the wall surface 4 and the distal end surface 12.

The movement of a distal end corner portion of the other side surface from P1 to P2 (refer to FIG. 3A), caused by the inclination of the nozzle vane 10, leads to the reduction of the clearance between the wall surface 4 and the distal end surface 12 from C0 to C1. The present invention utilizes the inclination of the nozzle vane 10 due to the fitting gap caused by the exhaust-gas pressure to reduce an amount leakage through spaces between the both end surfaces of the nozzle vane and the wall surfaces 4 of parallel walls 2.

FIG. 3B is a diagram for describing the first embodiment. The nozzle vanes 45 and the rotation shaft 49 are as described above. The through hole 53 is inclined to have a portion, closer to a wall surface 51a of one of the parallel walls, positioned closer to the turbine rotor 33, that is, more on the inner diameter side.

The inclination angle of the nozzle vane 45 is increased by the through hole 53 inclined to have a portion, closer to the wall surface 51a of one of the parallel walls, positioned more on the inner diameter side. Thus, with the inclination of the through hole 53, a clearance reduction promotion portion 65 is formed that achieves a larger reduction amount of clearance formed by the inclination of the nozzle vanes 45 toward the inner diameter side of the distal end surface 57.

In FIG. 3B, when the nozzle vane 45 is mounted with a center line 53a of the through hole 53 matching the center line 49a of the rotation shaft 49, an initial clearance C2 from the wall surface 59a is obtained which is reduced from the clearance C1 by an inclination amount of the through hole 53. This state is illustrated by a dotted line in FIG. 3B.

The initial clearance C2 is smaller than the clearance C1 after the effect of the exhaust-gas pressure in the comparative example shown in FIG. 3A. With the inclination by an amount corresponding to the backlash in the fitting gap between the through hole 53 and the rotation shaft 49 due to the exhaust-gas pressure, the distal end surface 57 of the nozzle vane 45 is further inclined toward the inner diameter side, whereby an even smaller clearance C3 can be achieved.

Thus, with the smaller clearance, the amount of exhaust gas leakage through the clearance can be reduced, whereby the supercharging efficiency can be prevented from degrading. The solid line in FIGS. 3A to 3C represents a state where the inclination has occurred due to the exhaust-gas pressure.

In a case of thermal deformation, the nozzle vanes 45 that are thin and are directly exposed to the exhaust gas respond quickly to a temperature to be thermally deformed. On the other hand, the nozzle vane accommodating unit 63 as a part of the parallel wall surface is thick and has a large thermal capacity, and thus has lower thermal deformation responsiveness than the nozzle vane 45. Thus, the wall surfaces 51a and 59a approach the both end surfaces 57 and 58 of the nozzle vanes 45 due to the time difference between the thermal deformation of the both end surfaces 57 and 58 of the nozzle vane 45 and the thermal deformation of the wall surfaces 51a and 59a of the parallel walls, as shown in FIG. 3C. This approached state is shown in FIG. 3C.

As in FIG. 3C, with a smaller clearance from the wall surfaces 51a and 59a, the inclined nozzle vanes 45 is pushed back by an amount corresponding to the backlash of the fitting gap between the through hole 53 and the rotation shaft 49. Thus, the nozzle vane 45 returns to a position orthogonal to the wall surfaces 51a and 59a, whereby the clearance from the wall surfaces 51a and 59a is maintained at an amount with which the nozzle vane 45 will not be stuck. In other words, the nozzle vane 45 will not be stuck due to the thermal deformation by setting an initial clearance C0. All things considered, the nozzle vane 45 is kept at a position that will not be stuck due to the thermal deformation.

The clearance reduction promotion portion 65 provides an effect of reducing the clearance without making the clearance smaller than the initial clearance C0 so that the nozzle vane 45 will not be stuck.

As described above, in the first embodiment, the clearance between the both end surfaces 57 and 58 of the nozzle vane 45, forming the variable nozzle mechanism 47 of the variable geometry turbocharger 1, and the wall surfaces 51a and 59a facing the both end surfaces is reduced to reduce the leakage flow, whereby the clearance loss can be reduced and the higher supercharging efficiency can be achieved. In particular, with the clearance loss reduced when the engine is accelerated with the nozzle vanes 45 fully closed, a higher acceleration performance can be achieved.

When thermal deformation occurs, the nozzle vanes 45 can be prevented from being stuck due to the both end surfaces 57 and 58 being in contact with the wall surfaces 51a and 59a.

(Second Embodiment)

Figure 4A:
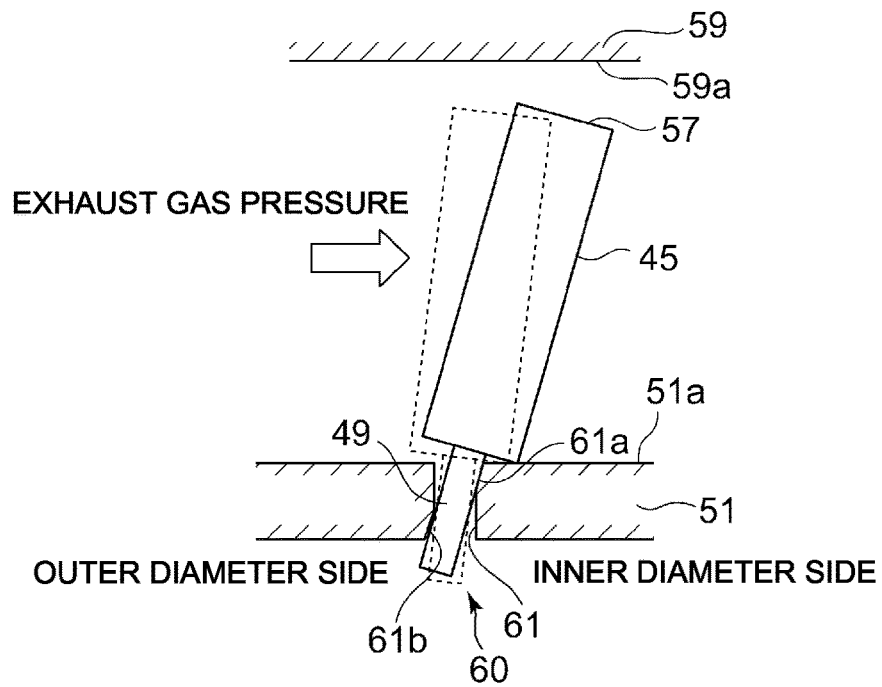
FIG. 4A is a diagram for describing a state where gas pressure is applied in a second embodiment.
Figure 4B:
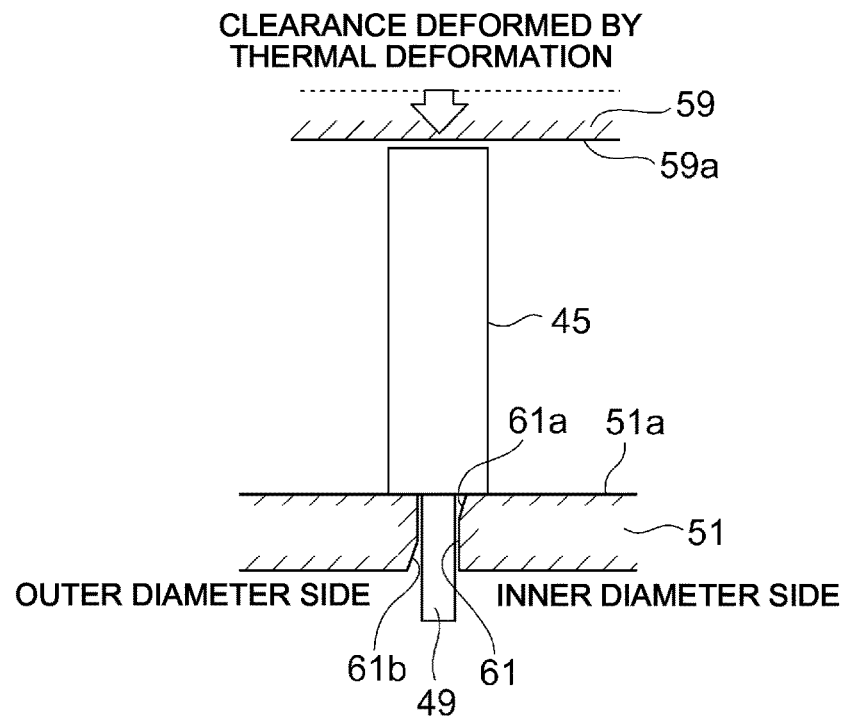
FIG. 4B is a diagram for describing a thermally deformed state in the second embodiment.

With reference to FIGS. 4A and 4B, a second embodiment will be described. The second embodiment achieves a clearance reduction promotion portion 60 with a chamfering structure. The clearance reduction promotion portion 60 increases the inclination angle of the nozzle vane 45 to further reduce the clearance. The nozzle vanes 45 and rotation shaft 49 are the same as those described in the first embodiment.

As shown in FIG. 4A, a through hole 61 is formed to be orthogonal to the wall surface 51a. An inner diameter side chamfered portion 61a is formed on an inner diameter side of the through hole 61 on a side of the nozzle vane. Furthermore, an outer diameter side chamfered portion 61b is formed on an outer diameter side on a side opposite to the nozzle vane.

At least one of or both of the inner diameter side chamfered portion 61a and the outer diameter side chamfered portion 61b may be provided.

When the inner diameter side chamfered portion 61*a* and the outer diameter side chamfered portion 61*b* are employed, the rotation shaft 49 and the nozzle vanes 45 need not to have modified shapes, and only chamfering needs to be performed on the opening end portions of the through hole 61, whereby processing to change the structure can be easily performed. The through hole 61 may have the side of the nozzle vane and/or the side opposite to the nozzle vane chamfered. Thus, the chamfered portion can be easily formed in accordance with the set inclination angle obtained by the chamfering.

By forming the chamfered portion, the lengths of the through hole 61 in the axial direction and the circumferential direction of the through hole 61 with the chamfered shape are preferably set in such a manner that an inclination angle θ of the nozzle vane 45 is preferably in a range from 0.3° to 5.0° and more preferably in a range of 0.5° to 5.0°. The inclination angle is an angle of inclination from a state of being orthogonal with respect to the wall surface.

FIG. 4B shows a thermally deformed state. As in FIG. 3C in the first embodiment, the inclined nozzle vane 45 is pushed back by the parallel wall surfaces 51*a* and 59*a* by an amount corresponding to the backlash of the fitting gap between the through hole 61 and the rotation shaft 49. Thus, the nozzle vane 45 returns to a position orthogonal to the wall surfaces 51*a* and 59*a*, whereby the clearance from the wall surface is maintained at an amount with which the nozzle vane 45 will not be stuck. In other words, the nozzle vane 45 will not be stuck due to the thermal deformation by setting the initial clearance C0. All things considered, the nozzle vane 45 is kept at a position that will not be stuck due to the thermal deformation.

(Third Embodiment)

Figure 5A:
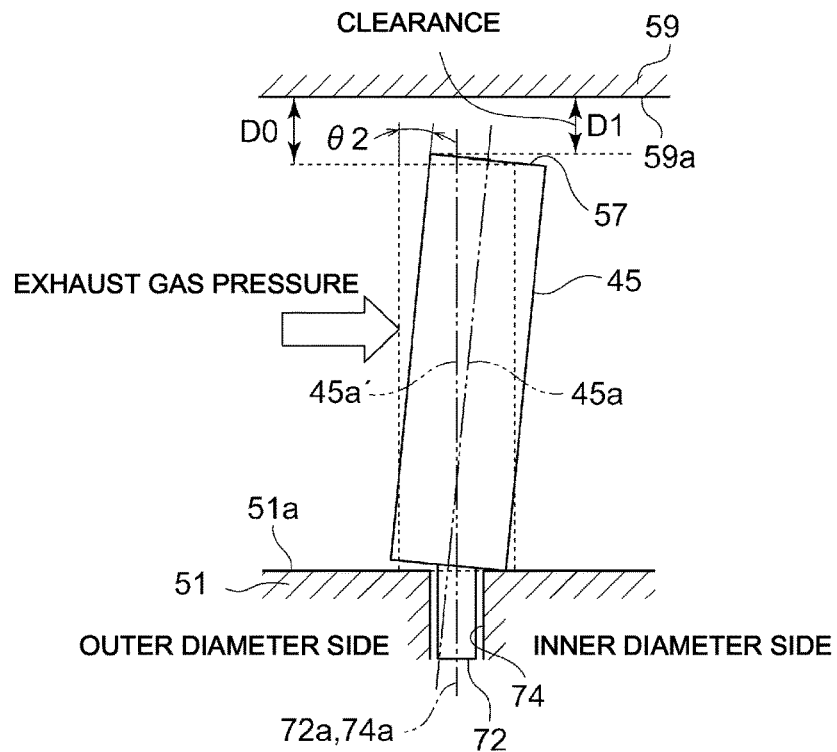
FIG. 5A is a diagram for describing a mounted state in a third embodiment.
Figure 5B:
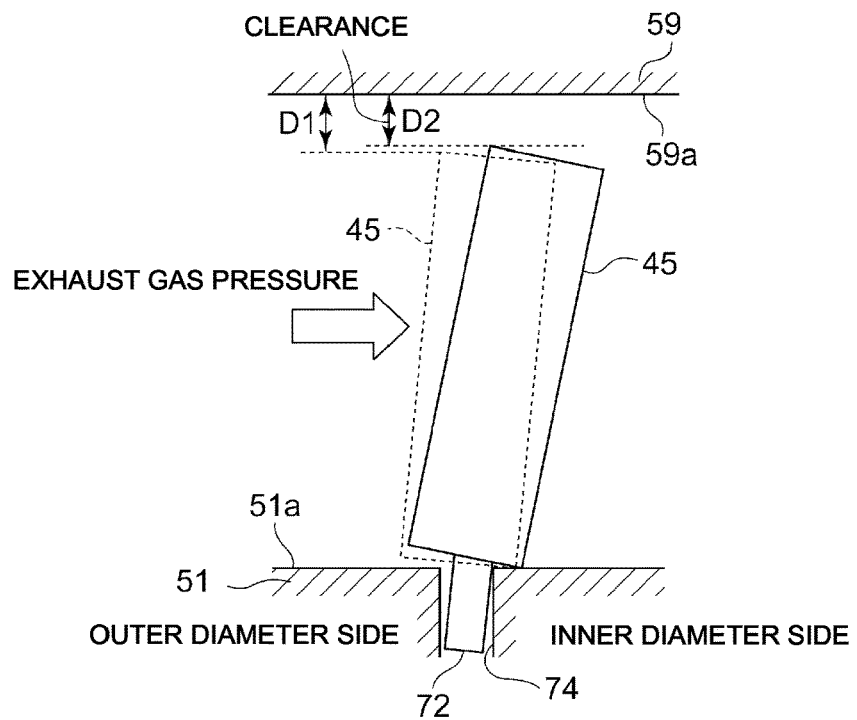
FIG. 5B is a diagram showing a state where gas pressure is applied in the third embodiment.
Figure 5C:
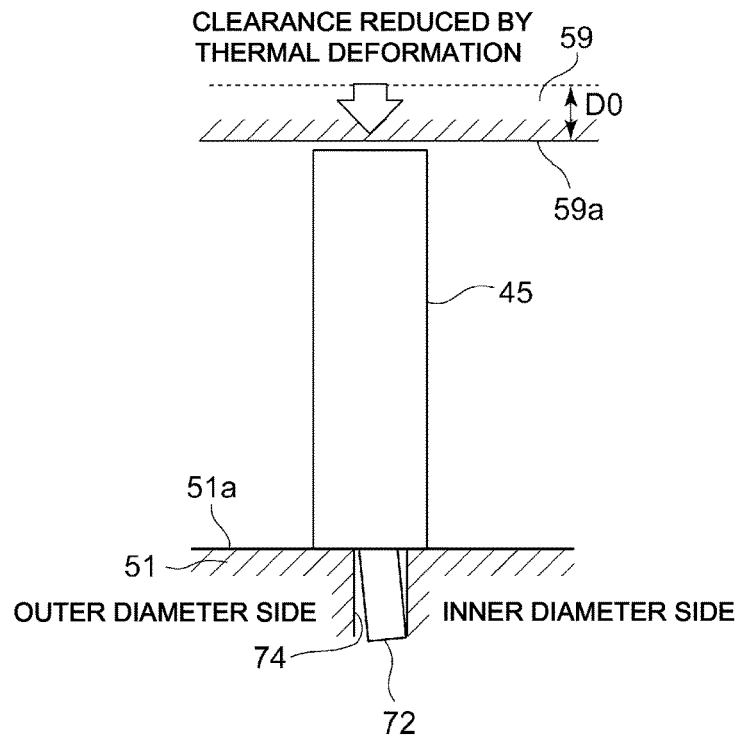
FIG. 5C is a diagram for describing a thermally deformed state in the third embodiment.

With reference to FIGS. 5A to 5C, a third embodiment will be described. The third embodiment achieves a clearance reduction promotion portion 70 which increases the inclination angle of the nozzle vane 45 to further reduce the clearance by making a center line 72*a* of a rotation shaft 72 and the center line 45*a* of the nozzle vane 45 inclined. The shape of the nozzle vane 45 is the same as that described in the first embodiment.

The center line 45*a* in the longitudinal direction in the rectangular cross sectional shape of the nozzle vane 45 is inclined toward the inner diameter side with respect to the center line 72*a* of the rotation shaft 72 fit in a through hole 74 formed in the wall surface 51*a* of one of the parallel walls to extend in a direction orthogonal to the wall surface 51*a*. Thus, both end surfaces in the rectangular cross-sectional shape orthogonal to the distal end surface 57 are inclined toward the inner diameter side with respect to the center line of 72*a* of the rotation shaft 72.

The shape in the comparative example shown in FIG. 3A is obtained as shown by a dotted line in FIG. 5A, when the center line 72*a* of the rotation shaft 72, a center line 74*a* of the through hole 74 extending in the direction orthogonal to the wall surface 51*a*, and a center line 45*a*' of the nozzle vane 45 in the longitudinal direction in the rectangular cross sectional shape match.

In the third embodiment, the center line 45 *a*' of the nozzle vane 45 in the longitudinal direction in the rectangular cross sectional shape is inclined toward the inner diameter side, whereby the nozzle vane 45 is inclined toward the inner diameter side by an inclination angle θ2.

With this inclination by the inclination angle θ2, an initial clearance D1 between one of the parallel wall surfaces 59*a* and the distal end surface 57 of the nozzle vane 45 is obtained.

When the exhaust-gas pressure acts on the nozzle vanes in this state, the rotation shaft 72 can be inclined by an amount corresponding to the backlash in the fitting gap in the through hole 74 to be inclined by a solid line in FIG. 5B. Thus, the nozzle vane 45 can be largely inclined toward the inner diameter side.

A clearance D2, smaller than the clearance D1, can be achieved by the inclination caused by the exhaust-gas pressure, whereby the clearance loss can be reduced.

FIG. 5C shows a thermally deformed state. As in FIG. 3C in the first embodiment, the inclined nozzle vane 45 is pushed back by the parallel wall surfaces 51*a* and 59*a* by an amount corresponding to the backlash of the fitting gap between the through hole 74 and the rotation shaft 72. Thus, as shown in FIG. 5C, the nozzle vane 45 returns to a position inclined toward the outer diameter side with respect to the parallel wall surfaces 51*a* and 59*a*, whereby the clearance from the parallel wall surfaces 51*a* and 59*a* is maintained at an amount with which the nozzle vane 45 will not be stuck. In other words, the nozzle vane 45 will not be stuck due to the thermal deformation by setting an initial clearance D0, that is, the nozzle vane 45 is kept at the position that will not be stuck even after the thermal deformation by an amount D0.

In the third embodiment, the clearance can be further reduced to the clearance D2, whereby the clearance loss can be reduced and the higher supercharging efficiency can be achieved.

The through hole 74 is not inclined with respect to the parallel wall surfaces 51*a*, but is orthogonal with respect to the wall surfaces 51*a*, and thus can be processed easily.

When thermal deformation occurs, the nozzle vane 45 can be prevented from being stuck with the both end surfaces in contact with the parallel wall surfaces 51*a* and 59*a*.

(Fourth Embodiment)

Figure 6A:
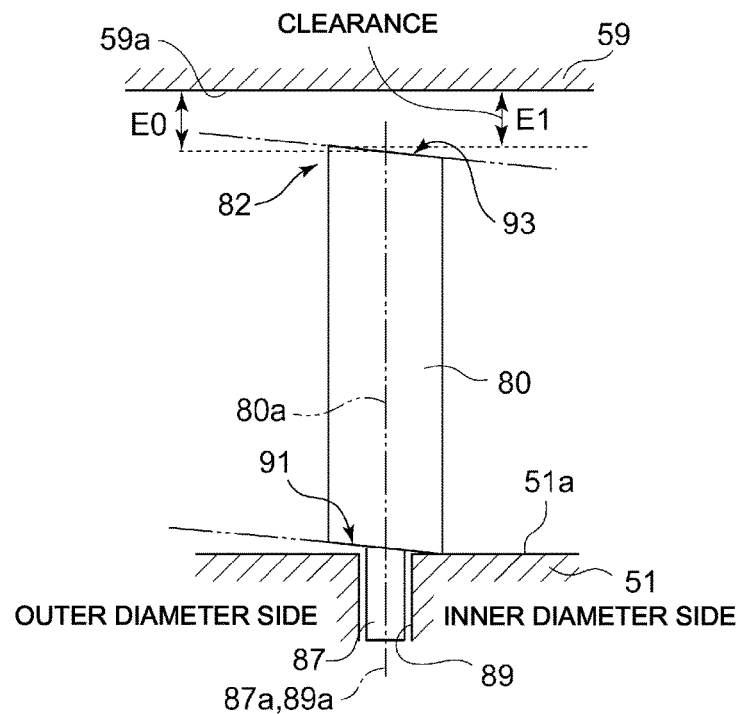
FIG. 6A is a diagram for describing a mounted state in a fourth embodiment.
Figure 6B:
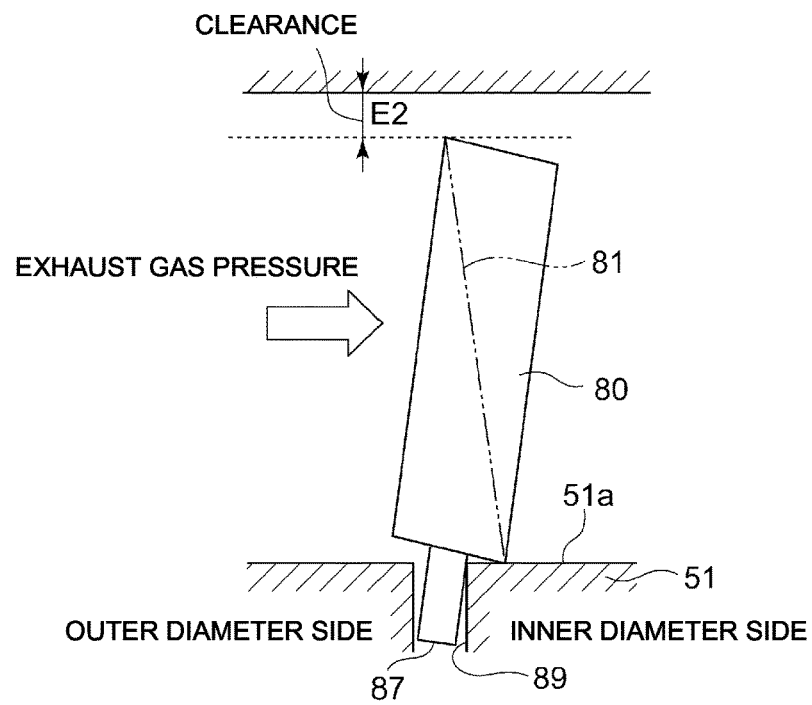
FIG. 6B is a diagram showing a state where gas pressure is applied in the fourth embodiment.
Figure 6C:
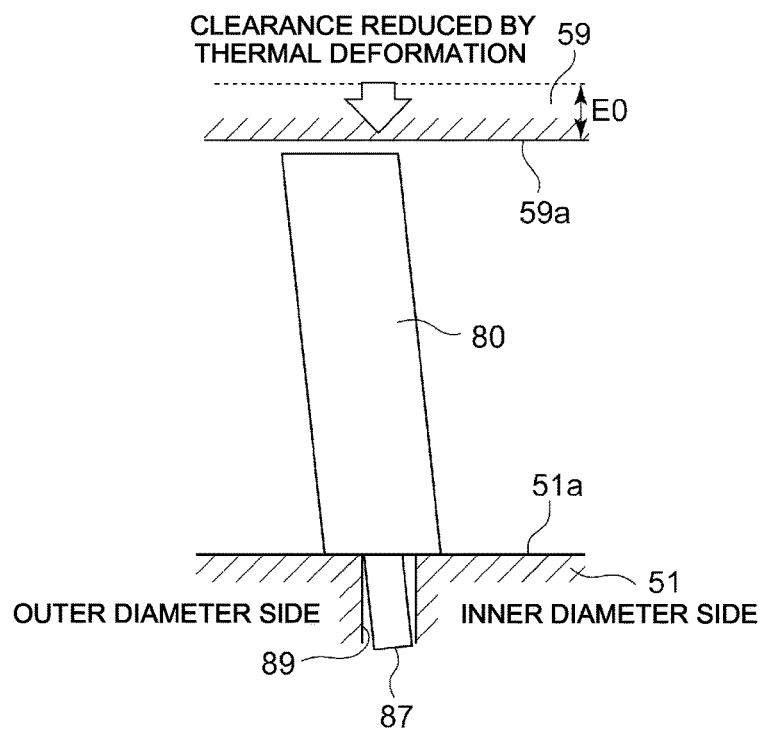
FIG. 6C is a diagram for describing a thermally deformed state in the fourth embodiment.
Figure 7:
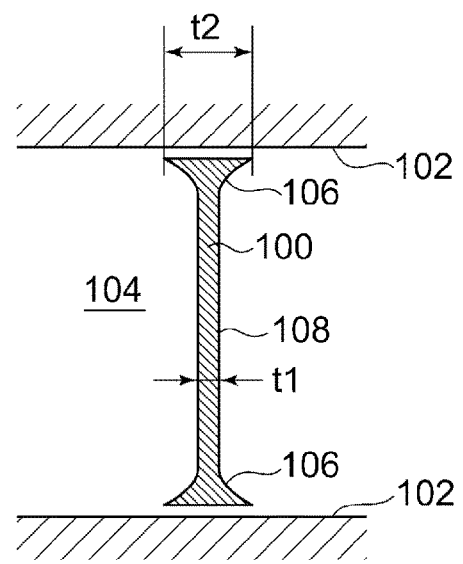
FIG. 7 is a diagram for describing a conventional technique.

With reference to FIGS. 6A to 6C, a fourth embodiment will be described.

In the fourth embodiment, a clearance reduction promotion portion 82 is formed with which an exhaust-gas-affected surface of a nozzle vane 80 is increased to further reduce the clearance. The clearance between a distal end surface 85 of the nozzle vane 80 and the wall surface 59*a* is reduced by increasing the exhaust-gas-affected surface and not by increasing the inclination angle of the nozzle vane 80.

Here, an end surface of the nozzle vane 80 on a side closer to a rotation shaft 87 and/or an end surface of the nozzle vane 80 on a side opposite to the rotation shaft 87 may be inclined.

FIGS. 6A to 6C show a case where the both end surfaces are inclined.

FIG. 6A shows a mounted state, an end surface 91 of the nozzle vane 80, having a substantially rectangular shape (for example, a parallelogram or a rectangle similar to the parallelogram), on a side of the rotation shaft 87 is inclined to have a portion more on the outer diameter side further from the corresponding one of the wall surface 51*a* and a portion more on the inner diameter side closer to the corresponding one of the wall surface 51*a*. Furthermore, an end surface 93 on a side opposite to the rotation shaft 87 is inclined to have a portion more on the outer diameter side closer to the corresponding one of the wall surface 59*a* and a portion more on the inner diameter side further from the corresponding one of the wall surface 59*a*. The both end surfaces are preferably inclined to be parallel to each other, but may not be parallel to each other as long as the inclined direction is the same.

As shown in FIG. 6A, when the nozzle vane 80 is mounted with a center line 87a of the rotation shaft 87 matched with a center line 89a of a through hole 89, a clearance E1 from the wall surface 59a, corresponding to the inclination of the end surface 93 of the nozzle vane 80, is obtained that is smaller than a clearance E0 as a comparative example.

As shown in FIG. 6B, with inclination by an amount corresponding to the backlash in the fitting gap between the through hole 89 and the rotation shaft 87 caused by the exhaust-gas pressure in the state with the initial clearance E1, the distal end surface 93 of the nozzle vane 80 is inclined toward the inner diameter side, whereby an even smaller clearance E2 can be achieved, and the clearance loss can be reduced.

When a diagonal line 81 of the substantially rectangular shape shown in FIG. 6B is set to be longer than the diagonal line of the rectangular shape in the first to the third embodiments, a larger exhaust-gas-affected surface, on which the exhaust-gas pressure acts, can be achieved. Thus, the clearance can be largely reduced under the exhaust-gas pressure even when the fitting gap between the through hole 89 and the rotation shaft 87 is the same as that in the comparative example shown in FIG. 3A.

The through hole 89 is orthogonal with respect to the wall surface 51a, and thus can be processed easily. Furthermore, the rotation shaft 87 is fixedly attached to the end surface 91 of the nozzle vane 80 with the center line 87a matching a center line 80a of the nozzle vane 80. Thus, the manufacturing is easier than in a case where the rotation shaft 87 is fixedly attached to the end surface of the nozzle vane 80 while being inclined with respect to the center line 80a of the nozzle vane 80.

When thermal deformation occurs as shown in FIG. 6C, the inclined nozzle vane 80 is pushed back by the parallel wall surfaces 51a and 59a by an amount corresponding to the backlash of the fitting gap between the through hole 89 and the rotation shaft 87. Thus, the nozzle vane 80 is inclined toward the outer diameter side with respect to the direction orthogonal to the parallel wall surfaces 51a, whereby the clearance from the wall surface 59a is maintained at an amount with which the nozzle vane 80 will not be stuck. In other words, the nozzle vane 80 is kept at the position with the initial setting clearance E0 with which the nozzle vane 80 will not be stuck.

In the fourth embodiment, the nozzle vane 80 has an inclined end surface. Thus, the clearance between the nozzle vane 80 and the wall surface 59a can be reduced, whereby the clearance loss can be reduced and the higher supercharging efficiency can be achieved.

The through hole 89 is orthogonal with respect to the wall surface 51a, and thus can be processed easily. Furthermore, the rotation shaft 87 is fixedly attached to the end surface 91 of the nozzle vane 80 with the center line 87a in the same direction as the center line 80a of the nozzle vane 80. Thus, the manufacturing is easier than in a case where the rotation shaft 87 is fixedly attached to the end surface of the nozzle vane 80 while being inclined with respect to the center line 80a of the nozzle vane 80.

An inclination angle increasing portion may be formed by one of or an appropriate combination between the embodiments. In the first to the third embodiments, the inclination angle of the nozzle vane 45 toward the inner diameter side by the exhaust-gas pressure due to the inclination angle increase may be set to be in a range from 0.3° to 5.0° and more preferably in a range from 0.5° to 5.0°.

The test has shown that the inclination angle of 0.3° or larger toward the inner diameter side is effective, the inclination angle of 0.5° or larger can reduce the clearance to half, and the inclination angle of 1° or larger can substantially eliminate the clearance. Thus, the range from 0.3° to 1.0° is preferable and the range from 0.5° to 1.0°, which has been proven to be especially effective, is even more preferable.

When the angle is equal to or larger than 5.0°, the nozzle vanes excessively inclined and thus are likely to be stuck on the surfaces of the parallel walls, and are likely to wear fast due to a large backlash.

INDUSTRIAL APPLICABILITY

In the present invention, a clearance between both end surfaces of each of nozzle vanes, forming a variable nozzle mechanism, and a wall surface facing the end surface is reduced to prevent a leakage flow and to reduce a clearance loss. When thermal deformation occurs, the nozzle vane can be prevented from being stuck due to the contact of the both end surfaces. Thus, the present invention is effective as a technique applied to a variable geometry turbocharger with the variable nozzle mechanism.

REFERENCE SIGNS LIST 1 variable geometry turbocharger
25 turbine casing
27 scroll
45, 80 nozzle vane
33 turbine rotor
51 nozzle mount
51a, 59a wall surfaces of parallel walls
59 ring plate
63 nozzle vane accommodating unit
49, 72, 87 nozzle shaft (rotation shaft)
53, 61, 74, 89 shaft hole (through hole)
57 distal end surface
58, 91, 93 end surface of nozzle vane
60, 65, 70, 82 clearance reduction promotion portion
61a inner diameter side chamfered portion
61b outer diameter side chamfered portion
81 diagonal line (exhaust-gas-affected surface)

The invention claimed is:

1. A variable geometry turbocharger in which exhaust gas from an engine acts on a turbine rotor through a scroll chamber formed in a turbine easing and a plurality of variable nozzle vanes, the variable geometry turbocharger comprising:
    a nozzle vane accommodating unit in which the plurality of variable nozzle vanes are arranged in a circumferential direction between the scroll chamber and the turbine rotor, the nozzle vane accommodating unit including parallel walls formed to be substantially parallel to a distal end surface and a base end surface of each of the plurality of variable nozzle vanes with a gap in between;
    a nozzle shaft which protrudes on the base end surface of a variable nozzle vane of the plurality of variable nozzle vanes and rotatably supports the variable nozzle vane;
    a shaft hole in which the nozzle shaft fits with a gap in between, the shaft hole being formed in one of the parallel walls;
    the distal end surface of the variable nozzle vane with which a clearance is reduced when the variable nozzle vane which has received exhaust-gas pressure is inclined toward an inner diameter side due to a fitting gap formed between the shaft hole and the nozzle shaft which are fitted to each other, the clearance being formed between the distal end surface and a wall surface of another one of the parallel walls; and a clearance reduction promotion portion which promotes reduction of the clearance, achieved by the inclination of the distal end surface of the variable nozzle vane, with an increased inclination angle of the distal end surface or an increased exhaust-gas-affected surface of the variable nozzle vane, wherein in the clearance reduction promotion portion, the shaft hole has an inclined center line that extends closer to the inner diameter side as the inclined center line extends toward a surface of the one of the parallel walls that defines an opening of the shaft hole.

2. The variable geometry turbocharger according to claim 1, wherein the inclination angle of the variable nozzle vane toward the inner diameter side is set to be in a range from 0.3° to 5.0°, due to an increase in the inclination angle of the variable nozzle vane achieved by the clearance reduction promotion portion.

3. The variable geometry turbocharger according to claim 1, wherein the variable nozzle vane is inclined toward the inner diameter side by the exhaust-gas pressure at the time when the variable nozzle vane is fully closed.

4. A variable geometry turbocharger in which exhaust gas from an engine acts on a turbine rotor through a scroll chamber formed in a turbine casing and a plurality of variable nozzle vanes, the variable geometry turbocharger comprising:

a nozzle vane accommodating unit in which the plurality of variable nozzle vanes are arranged in a circumferential direction between the scroll chamber and the turbine rotor, the nozzle vane accommodating unit including parallel walls formed to be substantially parallel to a distal end surface and a base end surface of each of the plurality of variable nozzle vanes with a gap in between;

a nozzle shaft which protrudes on the base end surface of the variable nozzle vane and rotatably supports the variable nozzle vane;

a shaft hole in which the nozzle shaft fits with a gap in between, the shaft hole being formed in one of the parallel walls;

the distal end surface of the variable nozzle vane with which a clearance is reduced when the variable nozzle vane which has received exhaust-gas pressure is inclined toward an inner diameter side due to a fitting gap formed between the shaft hole and the nozzle shaft which are fitted to each other, the clearance being formed between the distal end surface and a wall surface of another one of the parallel walls; and a clearance reduction promotion portion which promotes reduction of the clearance, achieved by the inclination of the distal end surface of the variable nozzle vane, with an increased inclination angle of the distal end surface or an increased exhaust-gas-affected surface of the variable nozzle vane, wherein in the clearance reduction promotion portion, at least one of an inner diameter side of the shaft hole on a side closer to the variable nozzle vane and an outer diameter side of the shaft hole on a side opposite to the variable nozzle vane is formed by chamfering.

5. The variable geometry turbocharger according to claim 4, wherein the inclination angle of the variable nozzle vane toward the inner diameter side is set to be in a range from 0.3° to 5.0°, due to an increase in the inclination angle of the variable nozzle vane achieved by the clearance reduction promotion portion.

6. The variable geometry turbocharger according to claim 4, wherein the variable nozzle vane is inclined toward the inner diameter side by the exhaust-gas pressure at a time when the variable nozzle vane is fully closed.

7. A variable geometry turbocharger in which exhaust gas from an engine acts on a turbine rotor through a scroll chamber formed in a turbine casing and a plurality of variable nozzle vanes, the variable geometry turbocharger comprising:

a nozzle vane accommodating unit in which the plurality of variable nozzle vanes are arranged in a circumferential direction between the scroll chamber and the turbine rotor, the nozzle vane accommodating unit including parallel walls formed to be substantially parallel to a distal end surface and a base end surface of each of the plurality of variable nozzle vanes with a gap in between;

a nozzle shaft which protrudes on the base end surface of a variable nozzle vane of the plurality of variable nozzle vanes and rotatably supports the variable nozzle vane;

a shaft hole in which the nozzle shaft fits with a gap in between, the shaft hole being formed in one of the parallel walls;

the distal end surface of the variable nozzle vane with which a clearance is reduced when the variable nozzle vane which has received exhaust-gas pressure is inclined toward an inner diameter side due to a fitting gap formed between the shaft hole and the nozzle shaft which are fitted to each other, the clearance being formed between the distal end surface and a wall surface of another one of the parallel walls; and a clearance reduction promotion portion which promotes reduction of the clearance, achieved by the inclination of the distal end surface of the variable nozzle vane, with an increased inclination angle of the distal end surface or an increased exhaust-gas-affected surface of the variable nozzle vane, wherein both end surfaces have a linear shape in a cross-sectional shape of the variable nozzle vane taken along the nozzle shaft direction, and in the clearance reduction promotion portion, a direction orthogonal to the distal end surface having the linear shape is inclined toward the inner diameter side with respect to a center line of the nozzle shaft which fits the shaft hole, the shaft hole extending in a direction orthogonal to a wall surface of the one of the parallel walls.

8. The variable geometry turbocharge according to claim 7, wherein the inclination angle of the variable nozzle vane toward the inner diameter side is set to be in a range from 0.3° to 0.5°, due to an increase in the inclination angle of the variable nozzle vane achieved by the clearance reduction promotion portion.

9. The variable geometry turbocharge according to claim 7, wherein the variable nozzle vane is inclined toward the inner diameter side by the exhaust-gas pressure at a time when the variable nozzle vane is fully closed.

10. A variable geometry turbocharger in which exhaust gas from an engine acts on a turbine rotor through a scroll chamber formed in a turbine casing and a plurality of variable nozzle vanes, the variable geometry turbocharger comprising:
- a nozzle vane accommodating unit in which the plurality of variable nozzle vanes are arranged in a circumferential direction between the scroll chamber and the turbine rotor, the nozzle vane accommodating unit including parallel walls formed to be substantially parallel to a distal end surface and a base end surface of each of the plurality of variable nozzle vanes with a gap in between;
- a nozzle shaft which protrudes on the base end surface of a variable nozzle vane of the plurality of variable nozzle vanes and rotatably supports the variable nozzle vane;
- a shaft hole in which the nozzle shaft fits with a gap in between, the shaft hole being formed in one of the parallel walls;
- the distal end surface of the variable nozzle vane with which a clearance is reduced when the variable nozzle vane which has received exhaust-gas pressure is inclined toward an inner diameter side due to a fitting gap formed between the shaft hole and the nozzle shaft which are fitted to each other, the clearance being formed between the distal end surface and a wall surface of another one of the parallel walls; and
- a clearance reduction promotion portion which promotes reduction of the clearance, achieved by the inclination of the distal end surface of the variable nozzle vane, with an increased inclination angle of the distal end surface or an increased exhaust-gas-affected surface of the variable nozzle vane,
- wherein both end surfaces have a linear shape in a cross-sectional shape of the variable nozzle vane taken along the nozzle shaft direction,
- in the clearance reduction promotion portion, in a state where a center line of the nozzle shaft is parallel with respect to a center line of the shaft hole which is extending in a direction orthogonal to a wall surface of the one of the parallel walls, one of the both end surfaces on a side of the nozzle shaft is inclined to have a portion more on an outer diameter side farther from the one of the parallel walls and have a portion more on an inner diameter side closer to the one of the parallel walls, and/or
- the distal end surface on a side opposite to the nozzle shaft is inclined to have a portion more on an outer diameter side closer to the other one of the parallel walls and a portion more on an inner diameter side farther from the other one of the parallel walls, to increase the exhaust-gas-affected surface of the variable nozzle vane.

11. The variable geometry turbocharger according to claim 10,
- wherein in the clearance reduction promotion portion, one of the base end surface on a side of the nozzle shaft is inclined to have a portion more on an outer diameter side farther from the one of the parallel walls and have a portion more on an inner diameter side close to the one of the parallel walls, and the distal end surface on a side opposite to the nozzle shaft is inclined to have a portion more on an outer diameter side closer to the other one of the parallel walls and a portion more on an inner diameter side farther from the other one of the parallel walls, to increase the exhaust-gas-affected surface of the variable nozzle vane, and
- wherein when thermal deformation occurs to reduce a distance between the parallel walls, the both end surfaces of the variable nozzle vane are pressed by the wall surfaces of the parallel walls to be inclined toward the outer diameter side with respect to the direction orthogonal to the wall surfaces.

12. The variable geometry turbocharger according to claim 10, wherein
- the inclination angle of the variable nozzle vane toward the inner diameter side is set to be in a range from 0.3° to 0.5°, due to an increase in the inclination angle of the variable nozzle vane achieved by the clearance reduction promotion portion.

13. The variable geometry turbocharge according to claim 10, wherein
- the variable nozzle vane is inclined toward the inner diameter side by the exhaust-gas pressure at a time when the variable nozzle vane is fully closed.

* * * * *